Nov. 20, 1923.                                                          1,474,435
A. T. McWANE
PIPE COUPLING
Filed May 23, 1922

Inventor
A. T. McWane
By C. A. Snowles
Attorneys

Patented Nov. 20, 1923.

1,474,435

UNITED STATES PATENT OFFICE.

ARTHUR T. McWANE, OF BIRMINGHAM, ALABAMA.

PIPE COUPLING.

Application filed May 23, 1922. Serial No. 563,032.

*To all whom it may concern:*

Be it known that I, ARTHUR T. McWANE, a citizen of the United States, residing at Birmingham, in the county of Jefferson and State of Alabama, have invented a new and useful Pipe Coupling, of which the following is a specification.

This invention aims to provide a simple means for packing the joints of a bell and spigot pipe, and for holding the packing, the device being applicable to a standard and known form of bell and spigot cast iron pipe, without working any changes in the standard construction of the pipe.

It is within the province of the disclosure to improve generally and to enchance the utility of devices of that type to which the invention appertains.

With the above and other objects in view, which will appear as the description proceeds, the invention resides in the combination and arrangement of parts and in the details of construction hereinafter shown and described, it being understood that, within the scope of what is claimed, changes in the precise embodiment of the invention shown can be made without departing from the spirit of the invention.

In the accompanying drawings:—

Figure 1:
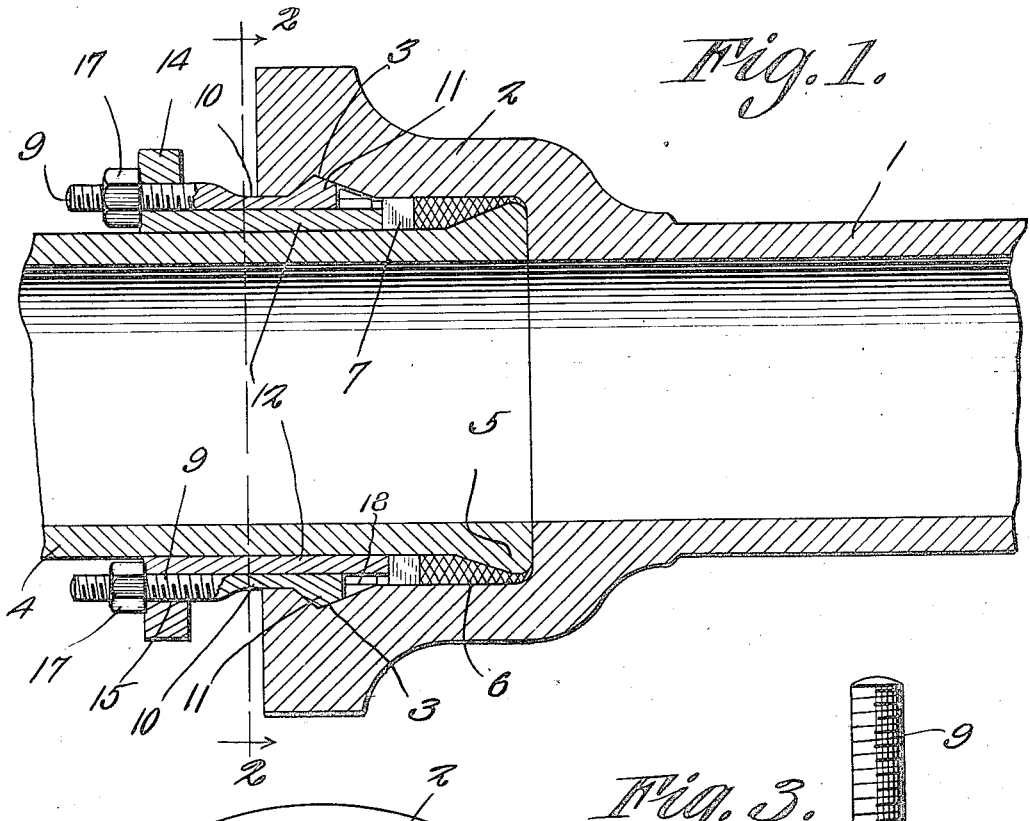
Figure 3:
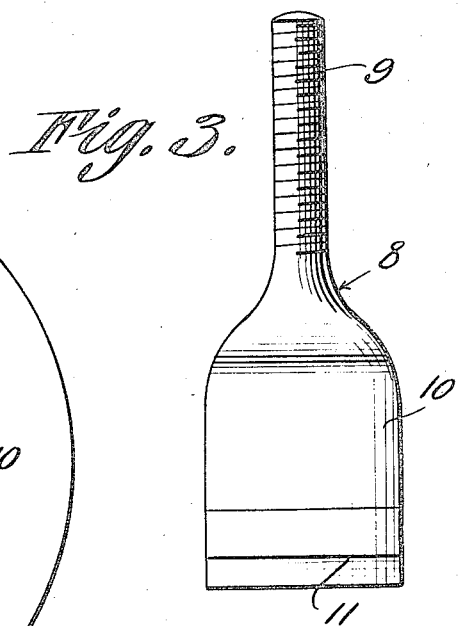
Figure 2:
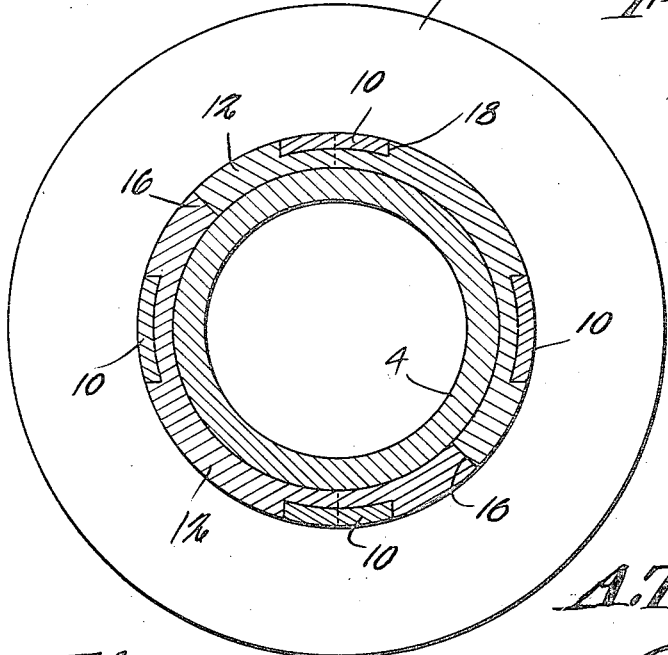

Figure 1 shows in longitudinal section a device constructed in accordance with the invention; Figure 2 is a cross section on the line 2—2 of Figure 1; and Figure 3 is an elevation showing one of the anchors.

The numeral 1 marks a pipe, comprising a bell 2, the bell being supplied with an internal circumferential seat 3. The numeral 4 marks a pipe, one end of which is received within the bell 2, the inner extremity of the pipe 4 being supplied with an outstanding bead 5, it being understood that the pipe 1 has an end such as that indicated at 5, and that the pipe marked by the numeral 4 ordinarily has a bell like that shown at 2.

A packing 6, of any desired construction, is located in the bell 2, about the member 4 and in engagement with the bead 5. A ring 7 is located in the bell 2 about the member 4 and engages the packing 6, the ring being divided at diametrically opposite points, or elsewhere, as indicated in dotted line in Figure 2 and as is evident by reason of the fact that the ends of the sections of the ring appear in elevation in Figure 1. The packing 6 and the ring 7 may be designed generally as a gland.

Any desired number of anchors 8 are provided, the anchors ordinarily being in the form of bolts, each including a threaded stem 9 and a broadened foot 10 provided with a transverse rib 11. The feet 10 of the anchors 8 extend within the bell 2, the ribs 11 being engaged in the internal circumferential seat 3 of the bell. A sleeve or compression member 12 fits about the pipe 4, the anchors 8 extending between the sleeve 12 and the bell 2, the sleeve or compression member 12 being supplied with longitudinal guide-ways 18, wherein the feet 10 of the anchors 8 are received. The inner end of the sleeve 12 abuts against the ring 7. At its outer end, the sleeve 12 is supplied with a laterally projecting flange 14 having openings 15. The sleeve 12 ordinarily is divided as indicated at 16, so that it may be placed readily about the pipe 4. The stems 9 of the anchors 8 pass through the openings 15 of the flange 14 of the sleeve 12, and nuts 17 are threaded on the stems 9, the nuts engaging the flange 14.

It will be obvious that by advancing the nuts 17 on the anchors 8, the sleeve 12 will be crowded against the ring 7 and the ring 7 will be forced against the packing 6, a joint resulting which will be well adapted to withstand high pressures. It is to be observed that the ring 7 extends across the inner ends of the guide grooves 18 in the sleeve 12 and, consequently, the packing 6 is prevented from blowing backwardly into or through the guide grooves.

The internal circumferential seat 3 cooperating with the ribs 11 of the anchors 8, holds the anchors against longitudinal movement. Advantage is taken of the seat 3, as a known element in a standard form of pipe, to provide means for holding the anchors in place, and no change in the standard pipe is made.

The packing 6 hereinbefore alluded to may be jute, or any other compressible material of a like sort. The device is so constructed that no lead is required, it being possible to secure, without the use of lead, a joint which will withstand a high pressure, the time ordinarily consumed in melting and pouring the lead being saved, when the device forming the subject matter of this application is used.

What is claimed is:—

1. In a device of the class described, a first pipe having a bell provided with an internal circumferential seat; a second pipe received in the bell; a gland in the bell about the second pipe; a compression member interposed between the second pipe and the bell and engaging the gland; and an anchor which embodies means for advancing the compression member, the anchor comprising an outstanding part engaged in the seat of the bell.

2. In a device of the class described, a first pipe having a bell provided with an internal circumferential seat; a second pipe received in the bell; a compression member interposed between the second pipe and the bell, and provided with a longitudinal guide groove; an anchor embodying means for advancing the compression member, the anchor comprising a part engaged in the seat of the bell; and a gland in the bell about the second pipe, the gland comprising a packing and a ring cooperating with the packing, the compression member engaging the ring, and the ring constituting a closure for the inner end of the guide groove, to prevent the packing from blowing therethrough, the anchor being received in the guide groove.

3. In a device of the class described, a first pipe having a bell provided with an internal circumferential seat; a second pipe received in the bell; a sleeve interposed between the second pipe and the bell and provided with a guide groove; a bolt slidable in the guide groove and comprising a part engaged in the seat of the bell; a nut threaded on the bolt and cooperating with the sleeve to advance the sleeve; and a gland in the bell, about the second pipe, the gland comprising a packing and a ring coacting with the packing, the ring constituting a closure for one end of the guide groove, to prevent the packing from blowing therethrough.

In testimony that I claim the foregoing as my own, I have hereto affixed my signature.

ARTHUR T. McWANE.